United States Patent
Kobres

(10) Patent No.: US 8,672,221 B2
(45) Date of Patent: Mar. 18, 2014

(54) SYSTEM AND METHOD OF SECURELY DELIVERING AND VERIFYING A MOBILE BOARDING PASS

(75) Inventor: Erick Kobres, Lawrenceville, GA (US)

(73) Assignee: NCR Corporation, Duluth, GA (US)

(*) Notice: Subject to any disclaimer, the term of this patent is extended or adjusted under 35 U.S.C. 154(b) by 66 days.

(21) Appl. No.: 13/285,914

(22) Filed: Oct. 31, 2011

(65) Prior Publication Data

US 2013/0105575 A1    May 2, 2013

(51) Int. Cl.
*G06K 5/00*  (2006.01)

(52) U.S. Cl.
USPC ........... 235/382; 235/380; 235/375; 713/176; 713/186

(58) Field of Classification Search
USPC ................... 235/382, 380, 375; 713/176, 186
See application file for complete search history.

(56) References Cited

U.S. PATENT DOCUMENTS

| | | | |
|---|---|---|---|
| 2010/0293386 A1* | 11/2010 | Kezzou et al. | 713/176 |
| 2011/0288768 A1* | 11/2011 | Stefani et al. | 701/201 |
| 2012/0042371 A1* | 2/2012 | Gur et al. | 726/9 |
| 2012/0066507 A1* | 3/2012 | Jobmann | 713/186 |
| 2012/0138679 A1* | 6/2012 | Doyle | 235/380 |
| 2012/0298737 A1* | 11/2012 | Thakar et al. | 235/375 |

* cited by examiner

*Primary Examiner* — Allyson Trail
(74) *Attorney, Agent, or Firm* — Paul W. Martin; Joseph P. Merhle

(57) ABSTRACT

A system and method of securely delivering and verifying a mobile boarding pass which validates the mobile boarding pass. An example method includes receiving boarding pass data for a traveler, creating a digital certificate containing the boarding pass data, encrypting the digital certificate, encoding a series of different encrypted digital certificates into a series of different two-dimensional barcodes, providing the series of different two-dimensional barcodes to a mobile communication device of the traveler in advance of arrival at a security checkpoint, receiving decoded barcode data in one or more of the two-dimensional barcodes from a barcode reader at the security checkpoint, decrypting the decoded barcode data using the plurality of different tokens, and identifying a valid digital certificate containing boarding pass data in the decoded barcode data.

3 Claims, 3 Drawing Sheets

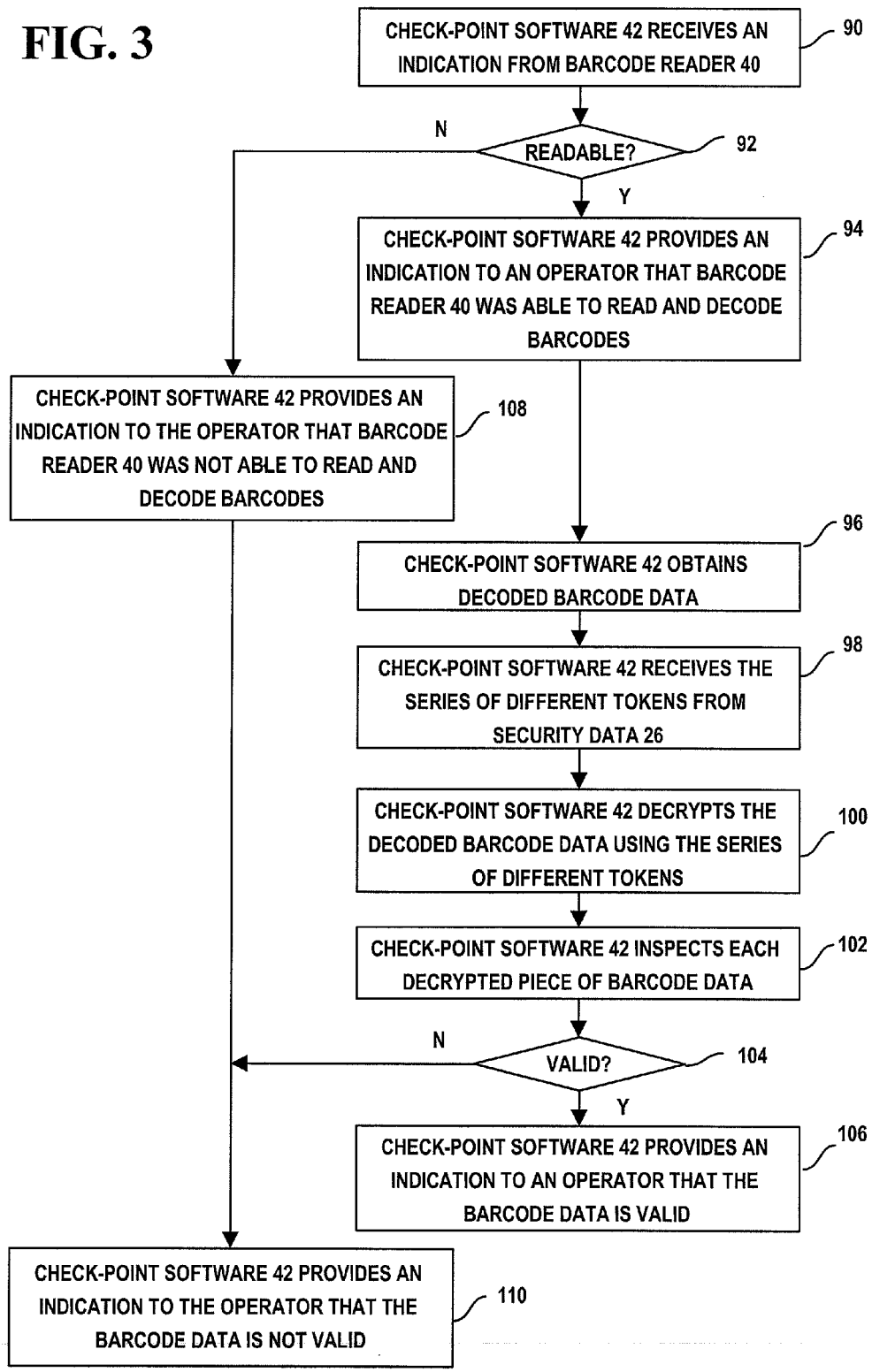

SYSTEM AND METHOD OF SECURELY DELIVERING AND VERIFYING A MOBILE BOARDING PASS

BACKGROUND

The present invention relates to secure access systems and methods and more specifically to a system and method of securely delivering and verifying a mobile boarding pass.

Barcoded boarding pass (BCBP) is a standard used by airlines which defines a two-dimensional barcode printed on a boarding pass or sent to a mobile phone for electronic boarding passes. The barcode is encoded with boarding pass information defined by the standard, such as traveler name, flight number, and flight date and time. The standard accepts different symbologies for use by mobile phones, including Aztec code, Datamatrix, and QR code. Barcodes may be delivered to mobile phones using Multimedia Messaging Service (MMS), electronic mail (e-mail) or Wireless Application Protocol (WAP).

Airlines, security organizations like the Transportation Security Administration (TSA), and possibly others use a barcode reader to read the two-dimensional barcodes and decode the barcodes to obtain and use the boarding pass information for security purposes, flight check-in, and possibly other uses.

The ability to capture and duplicate two-dimensional barcodes from paper or from a mobile device is a security risk for certain types of applications. It may be possible for an attacker to intercept a barcode and use it for fraudulent access, key-reverse-engineering, or other nefarious purposes.

For example, a two-dimensional barcode intercepted from a valid boarding pass may be used with a forged identification document, such as a forged driver's license, to pass through a Transportation Security Administration (TSA) checkpoint, at which a TSA representative checks the validity of the boarding pass and matches information from the boarding pass with information from the identification document.

Therefore, it would be desirable to provide a system and method of securely delivering mobile boarding passes which overcomes these problems.

SUMMARY

In accordance with the teachings of the present invention, a system and method of securely delivering and verifying a mobile boarding pass is provided.

An example method includes receiving boarding pass data for a traveler from reservation data, creating a digital certificate containing the boarding pass data, encrypting the digital certificate using a plurality of different tokens to produce a series of different encrypted digital certificates, encoding the series of different encrypted digital certificates into a series of different two-dimensional barcodes, providing the series of different two-dimensional barcodes to a mobile communication device of the traveler in advance of arrival at a security checkpoint, receiving decoded barcode data in one or more of the two-dimensional barcodes from a barcode reader at the security checkpoint following reading of the two-dimensional barcodes from the mobile communication device, decrypting the decoded barcode data using the plurality of different tokens, and identifying a valid digital certificate containing boarding pass data in the decoded barcode data.

BRIEF DESCRIPTION OF THE DRAWINGS

FIG. 3 is a flow diagram illustrating a method of verifying the boarding pass data.

DETAILED DESCRIPTION

Figure 1:
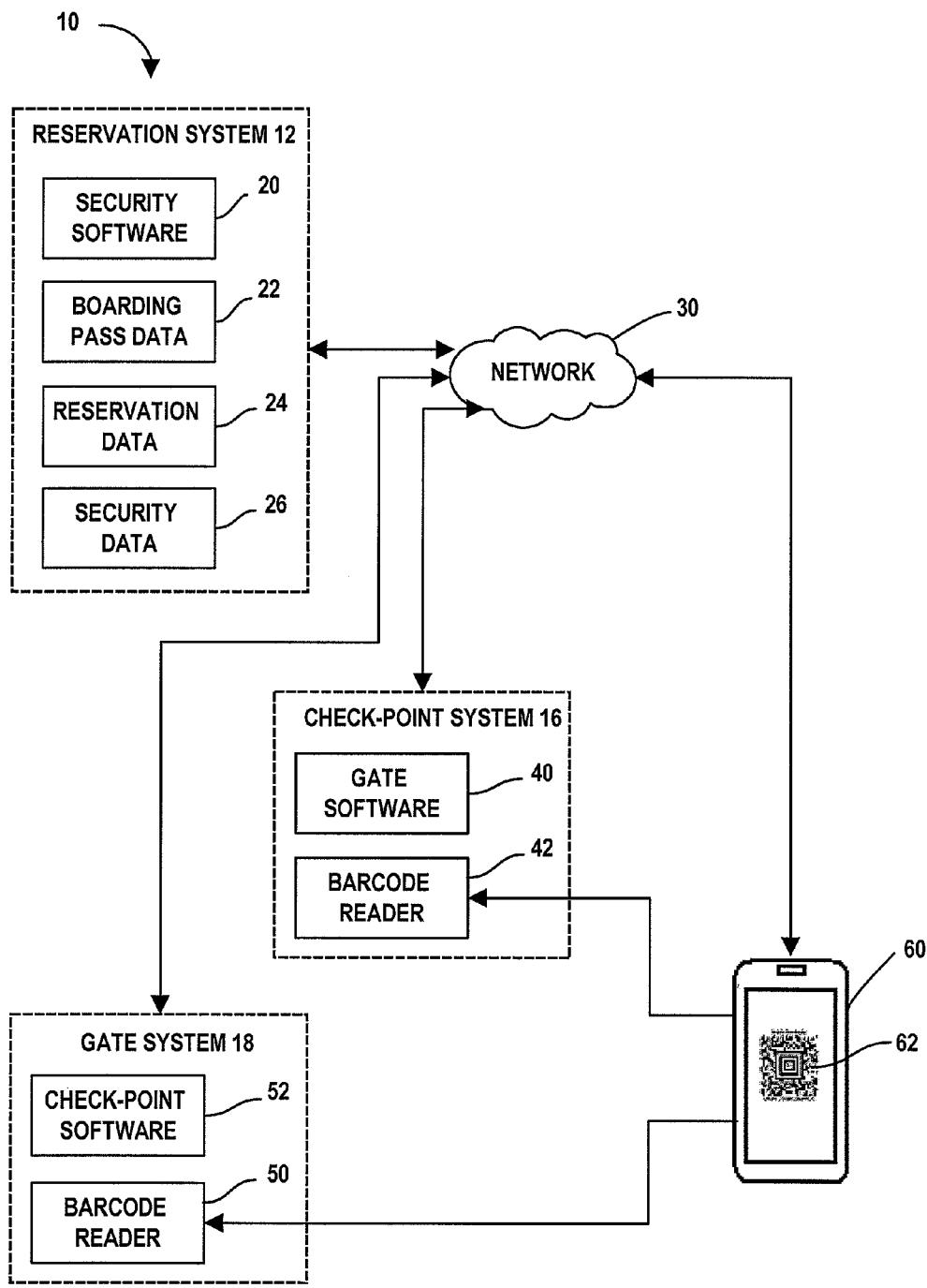
FIG. 1 is a block diagram of a network of travel systems.

Turning now to FIG. 1, an example airline system 10 includes reservation system 12, check-point system 14, and gate system 14.

Reservation system 12 executes security software 20 which secures boarding pass data 22 and generates a series of different barcodes 62 containing the secured boarding pass data. The secured boarding pass data validates the boarding pass data in barcodes 62 as not being fraudulently copied or altered when barcodes 62 are read at a security checkpoint or departure gate.

For example, security software 20 may create or obtain a digital certificate containing boarding pass data 22 and encrypt the digital certificate using a key or token. Security software 20 then generates the series of different barcodes 62 which can be decrypted by systems at the security checkpoints and departure gates using the token.

In an example embodiment, security software 20 obtains or generates a predetermined pattern or series of tokens for creating a series of different encrypted versions of the common digital certificate. Systems at the security checkpoints and departure gates use predetermined pattern or series of tokens to decrypt the different versions of the common digital certificate.

Security software 20 may obtain or derive boarding pass data 22 from reservation data 24. Travelers establish reservation data 24 when they book reservations for travel. For example, travelers provide identification information and choose flights and flight times when they book reservations. This and other information, such as contact information, is stored as reservation data 24.

Security software 20 may schedule delivery of the series of barcodes 62 and deliver the series of barcodes 62 to a mobile communication device 60 using the contact information provided by the traveler when the traveler booked the reservation. Security software 20 may deliver the series of barcodes 62 using any method identified in the barcoded boarding pass (BCBP) standard.

Security software 20 may further enhance security in a number of different ways. For example, security software 20 may deliver the series of barcodes 62 to mobile communication device 60 when presentation of barcodes 62 is required, such as during an initial security check at a security checkpoint. Security software 20 may deliver barcodes 62 a predetermined number of hours or minutes prior to the scheduled flight.

As another example, security software 20 may lock the series of barcodes 62 and deliver the locked series of barcodes 62 during or following completion of a on-line check-in procedure in which mobile communication device 60 connects to reservation system 12 in advance of arrival at an airport, or at some other time in advance of when display of screen images of the series of barcodes 62 is required. For example, security software 20 may send the series of barcodes 62 as a single file encrypted with a separate key than the key or keys used by security software 20 to encrypt the digital certificate or certificates.

A traveler may be required to enter the separate key into mobile communication device 60 to unlock and use the series of barcodes 62. For example, the key may include a personal identification number (PIN) or a biometric such as a fingerprint for mobile communication devices 14 equipped with biometric readers.

When security software 20 sends a key such as a PIN to unlock the series of barcodes 62, it does so separately from sending the series of barcodes. For example, using the contact information, security software 20 may send an electronic mail (e-mail) or a simple message service (SMS) or "text" message to mobile communication device 60 containing the PIN.

Alternatively, the separate key may include a Unique Identifier (UDID) of mobile communication device 60 provided by the traveler as part of reservation data 24, and mere use of mobile communication device 60 may be enough to use unlock and use the series of barcodes 62.

As another example, security software 20 may include a predetermined time period during which the series of barcodes must be read by a barcode reader at a security checkpoint or departure gate, which prevents the series of barcodes 62 from being read at any other time.

As another example, security software 20 may vary the time between barcodes 62 according to a predetermined pattern, so that only a barcode reader at a security check-point or departure gate can read the series of barcodes 62.

As another example, security software 20 may include expiration information which prevents the series of barcodes 62 from being read following a scheduled departure time.

Security software 20 may store the tokens, additional keys, digital certificate information, and additional rules or security requirements as security data 26.

Reservation system 12 may include one or more computers, each including a processor, memory, and program and data storage. Reservation system 12 may execute an operating system such as a Microsoft operating system. Reservation system 12 may execute other computer software that may be stored in a computer readable medium, such as a memory.

Reservation system 12 further includes network circuitry for connecting to network 30, and other circuitry for connecting to peripherals.

Network 30 may include any combination of wireless or wired networks, including a global communication network, also known as the Internet. Network 30 may include a local or wide area network portion shared by reservation system 12, check-point system 14, and gate system 16.

In an example embodiment, reservation system 12 may include a web server with addresses for web sites for delivering web pages.

Mobile communication device 60 downloads and displays the web pages for purposes including but not limited to establishing and logging into traveler accounts, setting or changing traveler preferences, making or cancelling reservations, checking loyalty status, paying or authorizing payment for flight services, and performing the on-line check-in procedure. Mobile communication device 60 may also connect to the reservation system web site to download the series of barcodes 62 containing boarding pass data.

Mobile communication device 60 may include a smart phone or other portable communication device.

Mobile communication device 60 may include a processor, memory, and program and data storage. Mobile communication device 60 may execute an operating system and other computer software that may be stored in a computer readable medium, such as a memory.

The software may, for example, include a software applet written to be executed within the operating system of the smart phone and provided by airline system 10.

For example, mobile communication device 60 may execute web browser software for displaying web pages from reservation system 12.

As another example, mobile communication device 60 may execute software for displaying screen images of barcodes 62 in a mobile boarding pass format.

As another example, mobile communication device 60 may execute software for receiving and decrypting files containing the series of barcodes 62.

Mobile communication device 60 may further include wireless network circuitry for connecting to network 30, graphics circuitry for connecting to a display, and other circuitry for connecting to other peripherals. Mobile communication device 60 and its graphics circuitry may be equipped with dynamic image rendering technology for dynamically creating and displaying screen images of the series of barcodes 62 during check-in at a departure gate.

After arriving at an airport, a traveler may be required to pass through one or more security checkpoints, such as a Transportation Security Administration (TSA) check-point or a departure gate. Check-point system 14 and gate system 16 may share security data 26.

Check-point system 14 includes a barcode reader 40 capable of reading the series of barcodes 62.

Check-point system 14 may include one or more computers, each including a processor, memory, and program and data storage. Check-point system 14 may execute an operating system such as a Microsoft operating system. Check-point system 14 may execute other computer software that may be stored in a computer readable medium, such as a memory.

Check-point system 14 may further include network circuitry for connecting to network 30, and other circuitry for connecting to peripherals such as barcode reader 40.

A traveler uses mobile communication device 60 to display screen images of the series of barcodes 62. The traveler places the display of mobile communication device 60 facing barcode reader 40 so that barcode reader 40 may read and decode the series of barcodes 62.

Check-point system 14 executes check-point software 42 for receiving decoded barcode data from barcode reader 40 and for determining whether the boarding pass data is valid. For this purpose, check-point software 42 decrypts the decoded barcode data using the tokens used by security software 20 and determines whether decoded barcode data includes a valid digital certificate created by security software 20 containing the boarding pass data.

In addition to a reference token, security data 26 may also include other security settings, such as time and sequence data for the series of barcodes 62.

Security requirements for reading the series of barcodes 62 may vary. In one example embodiment, check-point software 42 may determine that security requirements have been satisfied if barcode reader 40 reads and decodes two or more barcodes 62 in the series of barcodes 62 and check-point software 42 is able to establish that the two or more barcodes 62 contain boarding pass data signed with a valid digital certificate.

In another example embodiment, check-point software 42 may determine that security requirements have been satisfied if barcode reader 40 reads and decodes two or more barcodes 62 according to a predetermined pattern or order, for example, two or more consecutive barcodes 62, and checkpoint software 42 is able to establish that the two or more barcodes 62 contain boarding pass data signed with a valid digital certificate.

In another example embodiment, check-point software 42 may determine that security requirements have been satisfied if barcode reader 40 reads and decodes two or more barcodes 62 separated by correct predetermined time periods associated with those barcodes 62, and check-point software 42 is able to establish that the two or more barcodes 62 contain boarding pass data signed with a valid digital certificate.

In these and/or other example embodiments, check-point software 42 may determine that security requirements have not been met if barcode reader 40 detects and reads only a static image of a barcode 62, or reads the barcodes 62 outside of a predetermined time period that the digital certificate is valid, or if the digital certificate for the series of barcodes 62 has expired.

Gate system 16 may include one or computers, each including a processor, memory, and program and data storage. Gate system 16 may execute an operating system such as a Microsoft operating system. Gate system 16 may execute other computer software that may be stored in a computer readable medium, such as a memory.

Gate system 16 may further include network circuitry for connecting to network 30, and other circuitry for connecting to peripherals such as barcode reader 50.

Barcode reader 50 may also be capable of reading the series of barcodes 62 and gate system 16 may be configured in a similar fashion as check-point system 14. Gate system 16 executes gate software 52 for receiving decoded barcode data from barcode reader 40 and for determining whether the boarding pass data is valid. For this purpose, gate software 52 decrypts the decoded barcode data using the tokens used by security software 20 and determines whether decoded barcode data includes boarding pass data signed with the digital certificate used by security software 20.

In an alternative embodiment, barcode reader 50 may be capable of reading only a single barcode 62. Gate software 52 may determine that a different, more relaxed, set of security requirements at a gate have been satisfied if barcode reader 50 reads and decodes one of the series of barcodes 62 and gate software 52 is able to establish that the one barcode 62 includes a digital certificate created by security software 20 containing the boarding pass data.

Figure 2:
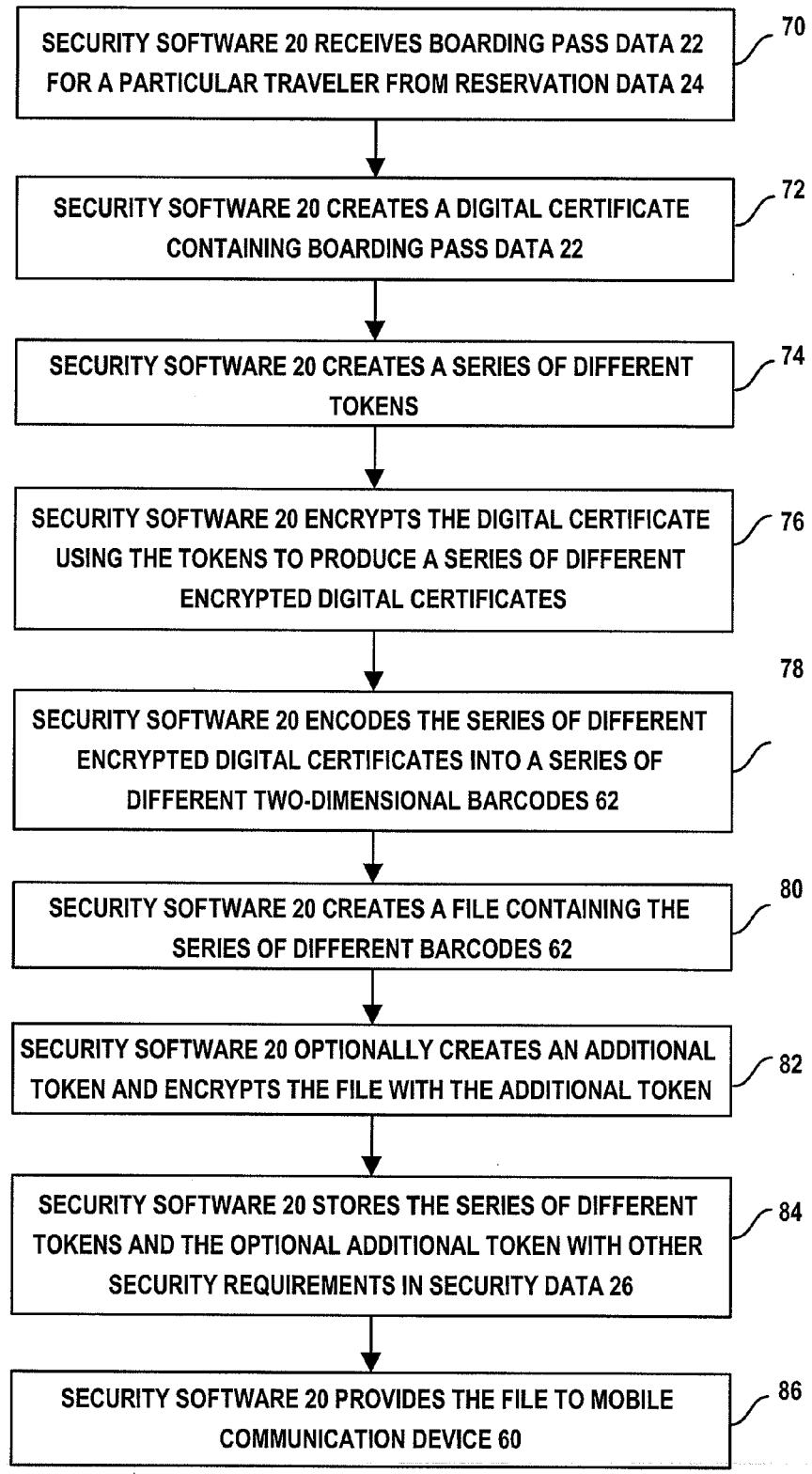
FIG. 2 is a flow diagram illustrating a method of delivering boarding pass data.

Turning now to FIG. 2, an example boarding pass delivery method is illustrated in detail beginning with step 70.

In step 70, security software 20 receives boarding pass data 22 for a particular traveler from reservation data 24.

In step 72, security software 20 creates a digital certificate containing boarding pass data 22.

In step 74, security software 20 creates a series of different tokens.

In step 76, security software 20 encrypts the digital certificate using the tokens to produce a series of different encrypted digital certificates.

In step 78, security software 20 encodes the series of different encrypted digital certificates into a series of different two-dimensional barcodes 62.

In step 80, security software 20 creates a file containing the series of different barcodes 62.

In step 82, security software 20 optionally creates an additional token and encrypts the file with the additional token.

In step 84, security software 20 stores the series of different tokens and the optional additional token with other security requirements in security data 26. Either or both of check-point software 16 and gate software 18 may then use the tokens and security requirements when the traveler arrives at those locations.

In step 86, security software 20 provides the file to mobile communication device 60. If the file is encrypted, security software 20 separately provides the additional token to mobile communication device 60.

Mobile communication device 60 displays the series of different barcodes 62 at a security check-point (or departure gate).

Turning now to FIG. 3, an example method of verifying the boarding pass data is illustrated in detail beginning with step 90.

In step 90, check-point software 42 (or gate software 52) receives an indication from barcode reader 40 (or barcode reader 50) following an attempt to read and decode barcodes from mobile communication device 60.

In step 92, check-point software 42 determines whether barcode reader 40 was able to read and decode barcodes from mobile communication device 60. If so, operation proceeds to step 94. Otherwise, operation proceeds to step 108.

In step 94, check-point software 42 provides an indication to an operator that barcode reader 40 was able to read and decode barcodes from mobile communication device 60.

In step 96, check-point software 42 (or gate software 52) obtains decoded barcode data from one or more of barcodes 62 following reading and decoding by barcode reader 40 (or barcode reader 50).

In step 98, check-point software 42 receives the series of different tokens from security data 26.

In step 100, check-point software 42 decrypts the decoded barcode data using the series of different tokens. In an example embodiment, check-point software 42 applies each token against each piece of barcode data.

In step 102, check-point software 42 inspects each decrypted piece of barcode data.

In step 104, check-point software 42 determine whether it includes a valid digital certificate created by security software 20 containing the boarding pass data.

In an example embodiment, check-point software 42 determines whether at least two pieces of barcode data include the valid digital certificate created by security software 20 and containing the boarding pass data. If so, operation continues to step 106. Otherwise, operation continues to 110.

In step 106, check-point software 42 provides an indication to an operator that the barcode data is valid. The operator may allow the traveler to pass through the check-point.

Returning to step 92, check-point software 42 provides an indication to the operator that barcode reader 40 was not able to read and decode barcodes from mobile communication device 60 in step 108. Operation proceeds to step 110.

Returning to step 104, check-point software 42 provides an indication to the operator that the barcode data is not valid in step 110. The operator may investigate further and/or alert security personnel.

Check-point software 42 may optionally perform other security tests using data and rules in security data 26, such as whether the two pieces of barcode data occur consecutively in the series, whether the barcode data has been read outside of an authorized time period, or whether the barcode data has expired.

Although the present invention has been described with particular reference to certain preferred embodiments thereof, variations and modifications of the present invention can be effected within the spirit and scope of the following claims. For example, while the present invention has been described with reference to an airline and air travel, other transportation methods and venues are also envisioned. Other security applications for the techniques of the present invention are also envisioned.

What is claimed is:

1. A method of delivering a boarding pass comprising:
receiving boarding pass data for a traveler from reservation data;
creating a digital certificate containing the boarding pass data;
encrypting the digital certificate using a plurality of different tokens to produce a series of different encrypted digital certificates;
encoding the series of different encrypted digital certificates into a series of different two-dimensional barcodes;
providing the series of different two-dimensional barcodes to a mobile communication device of the traveler, the traveler providing a key to unlock and use the series of different two-dimensional barcodes, the key acquired via the traveler via a text message sent to the mobile communication device.

2. A method of verifying a mobile boarding pass comprising:
receiving decoded barcode data in one or more two-dimensional barcodes of the mobile boarding pass from a barcode reader after a traveler supplies a key to unlock the barcodes for use on a mobile device, the key acquired by the traveler via reservation data already residing on a mobile device of the traveler;
decrypting the decoded barcode data using a series of different tokens; and
identifying a valid digital certificate containing boarding pass data in the decoded barcode data.

3. A mobile boarding pass method comprising:
receiving boarding pass data for a traveler from reservation data;
creating a digital certificate containing the boarding pass data;
encrypting the digital certificate using a plurality of different tokens to produce a series of different encrypted digital certificates;
encoding the series of different encrypted digital certificates into a series of different two-dimensional barcodes that a traveler uses from a mobile device by unlocking via a key, the key unusable if unused within a predetermined period of time;
providing the series of different two-dimensional barcodes to a mobile communication device of the traveler in advance of arrival at a security checkpoint;
receiving decoded barcode data in one or more of the two-dimensional barcodes from a barcode reader at the security checkpoint following reading of the two-dimensional barcodes from the mobile communication device;
decrypting the decoded barcode data using the plurality of different tokens; and
identifying a valid digital certificate containing boarding pass data in the decoded barcode data.

* * * * *